Patented July 21, 1953

2,646,377

UNITED STATES PATENT OFFICE 2,646,377

METHOD OF MAKING AND BONDING BRAKE FRICTION MATERIAL TO A BRAKE SHOE

Sydney G. Tilden, Jr., Stewart Manor, N. Y., assignor to The Permafuse Corp., a corporation of New York No Drawing. Application January 3, 1949, Serial No. 69,039

2 Claims. (Cl. 154—81)

This invention relates to bonding materials in dry tape form employing thermosetting resins as the adhesive, used particularly to attach friction material segments to brake shoes, and has for its object the increase in shelf life of the uncured tape material by increasing the time element between its date of manufacture and the latest date of usefulness, subsequent to which latter date it must be discarded or rejuvenated.

The invention resides in a bonding tape of a thermosetting resinoid of the phenol aldehyde type, more specifically the phenol-formaldehyde and the phenol-furfural types, in which the tape having been impregnated by a mixed solution of high vapor pressure and low vapor pressure solvents, the percentage of the low vapor pressure solvent corresponding to a predetermined percentage of residual solvent, and the percentage of the high vapor pressure solvent corresponding to the amount of the remainder of the solvent to give the solution the proper percentage of resin solids, has been subjected to heat to evaporate the solvents to the extent that the remaining solvents consist substantially of only the low vapor pressure solvent corresponding to about 14 to 18% of the resin solids, to provide a flow when subjected as a bonding agent clamped between the surfaces to be bonded and heated to complete polymerization of the resinoids and the process of making the same.

The invention will be more fully described hereinafter and finally pointed out in the claims.

Bonding tapes utilizing thermosetting resins heretofore proposed employ a resinoid of the phenol-formaldehyde or phenol-furfural type as the adhesive. Unsupported films of these resinoids are difficult to produce because of the brittleness of the dried film. Therefor it has been proposed to form the tapes or sheets with a material of indiscriminately disposed asbestos or cellulose fibres, which are impregnated and coated, and skeletonized, with a high vapor pressure solvent, that is an alcohol solution of the resins selected, which were subsequently dried by means of infra-red lamps or hot air drafts to the point at which the coating surface is hard. The tape could then be rolled or packaged without subsequent blocking either to itself or to an interwrapping material if such is employed. It is important however, to retain as much as possible of the volatile solvent in order to reduce the brittleness of the finished tape. The presence of such a volatile solvent acts as a plasticizer in the uncured tape which reduces the brittleness and prevents the resultant cracking of the tape material. On the other hand an excess of the volatile solvent present in the coating results in a sticky product finish so that it is impossible to roll or package the tape without excessive blocking.

The normal practice for overcoming the problem of sticky surface coating has been to reduce the volatile content in the resin by continued drying to the point where the tape is surface hard and combating the brittleness of such excessively dry tape by the use of additional plasticizers. Such well known and accepted plasticizers as tricresyl phosphate and dibutyl phthalate have been tested, but I have found that employing such plasticizers in bonding tape substantially reduces the bond strength because these substances, on curing, during the bonding action, exude on the faying surfaces and prevent proper resin adhesion. I have found that tapes containing incompletely dried resin with a volatile content in the range of 14% to 18% of the resin solids are sufficiently dry to permit rolling or packaging without blocking and yet are not too brittle. However, it has been impossible to maintain this volatile content over an extended time period, because, for celerity and facility in production the resinoid solvent used in such manufacture has a high evaporation rate. This same resinoid solvent continues to evaporate at a comparatively rapid rate, thus favoring the formation of the undesirable brittle tape material.

The evaporation rate of a fluid is a direct function of its vapor pressure, and anhydrous denatured ethyl alcohol, usually employed as the foregoing solvent, has a relatively high vapor pressure of 44 mm. Hg at 20° C.

On the other hand, solvents for either phenol-formaldehyde or phenol-furfural resins having a low evaporation rate, (relatively low vapor pressure), if used, cannot be used exclusively as the solvent for the resin because it then becomes difficult and time consuming to dry the coating to the point where no blocking occurs in packaging, without using such high temperatures as would advance the resin to its completely polymerized state.

Examples of such solvents are isophorone with a vapor pressure of 0.3 mm. Hg at 20° C., and diisobutyl ketone, with a vapor pressure of 1.7 mm. Hg at 20° C.

Neither of the foreging paths lead to satisfactory results. The underlying conception of the present invention, is to combine two solvents in such proportion that in solution the percentage of the low vapor pressure solvent corresponds to the desired percentage of residual solvent, and the percentage of the high vapor pressure solvent corresponds to the amount of the remainder of the solvent, to give the solution the proper percentage of resin solids. By so doing the desired effect could be achieved. The resultant tape product remained soft and pliable over a period of many months while stored at room temperature. The celerity and the facility in production capable with the high vapor pressure solvent, more specifically anhydrous denatured ethyl alcohol, and also the plasticity of the finished tape product, are retained.

When the combination of the high vapor pressure solvent and the low vapor pressure solvent was used in the manufacture of the tape product, a surprising and unexpected result was perceived. Not only was the final product more flexible and more pliable, but also there was a marked increase in the shelf life of the product. The time element between the date of manufacture and the latest date of usefulness had been materially increased.

Apparently this increase in useful life can be attributed to the extended time period during which the volatile content of the tape product remains sufficiently high to produce resin flow in the subsequent bonding action. Flow of the resinoid is important when it is employed in its ultimate use as a bonding agent and clamped between the surfaces to be bonded and heated to cause complete polymerization of the resinoid. Such flow is essential in order to carry the resin into the fibres, pores, or interstices of the surfaces to be bonded.

It has been found that in the prior art the flow usually employed as aforementioned may be augmented by increasing the bonding pressure, or by increasing the percentage of volatile solvent present. In many cases, it is not possible, because of limitations of practicability and convenience, to increase the bonding pressure to induce an adequate amount of flow necessary to a strong bond. In such cases, adequate flow may be induced by increasing the percentage of the volatile solvent of the tape.

A volatile content in the range of about 14 to 18% of the resin solids as mentioned before, is not only permissible from a surface drying standpoint but also highly desirable to induce volatile flow when the tape is employed in its ultimate use as a bonding agent. But as before stated, such tapes had serious disadvantages.

The improvement consists in a solution embodying a percentage of low vapor pressure solvent corresponding to a desired percentage of residual solvent, and of a percentage of the high vapor pressure solvent for the remainder of the solvent, to give the solution the proper percentage of resin solids. The solution thus contains resin solids in a mixed solution of high vapor pressure solvent and low vapor pressure solvent. I have found that solutions made up within the following ranges have given excellent results.

|  | Table 1 Phenol-Formaldehyde Solution | Table 2 Phenol-Furfural Solution |
| --- | --- | --- |
| Resin Solids__percent by weight__ | 35-45 | 35-45 |
| Isophorone (low vapor pressure solvent)____percent by weight__ | 3-7 | 3-10 |
| Anhydrous denatured ethyl alcohol (high vapor pressure solvent)_____percent by weight__ | 45-60 | 45-60 |

The distinction between a low vapor pressure and a high vapor pressure solvent is well known to the art.

In manufacturing such an improved bonding tape the material employed, such as the indiscriminately dispersed asbestos fibres in the form of asbestos paper sheet, is first impregnated with a resin solution containing 40% resin solids and 60% anhydrous denatured ethyl alcohol, a high vapor pressure solvent. Such impregnation is preferably carried out by first subjecting the asbestos paper sheet to a vacuum in the range of 24″ to 26″ Hg for at least one hour. Then, while still under vacuum, the resin solution is admitted to the vacuum tank and the asbestos paper sheet soaked in the resin solution under the above mentioned vacuum for at least one hour. The vacuum is then released and pressure in the range of 80 to 100 p. s. i. put on the vacuum tank for one hour. It has been found that this cycle thoroughly impregnates the asbestos to the point of maximum penetration from face to face of the paper. The tape is then dipped in an identical resin solution at atmospheric pressure and dried under infra-red lamps until the volatiles remaining are within the range of 8% to 14% of the resin solids. The tape is then subjected to a final dip in the solution described in Table 1 or Table 2, and is dried under infra-red lamps until there remains a volatile content in the range of 14% to 18% of the resin solids. The final tape, in this embodiment, has the skeletonized resinoid and the asbestos fibers extend from face to face of the tape. The temperature of the tape under the infra-red lamps must be held below the boiling point of the low vapor pressure solvent which is 215.2° C. for isophorone and 168.1° C. for diisobutyl ketone. The drying is continued until the solvent remaining in the resin of the finished tape is virtually all low vapor solvent with a low evaporation rate.

As an alternate the impregnation and the first dip could be carried out by the use of the combined solvent solution of either Table 1 or Table 2.

As a result, a bonding tape of my improved composition is easy to manufacture since rapid evaporation of the high vapor pressure solvent presents no problem and yet the remaining solvent of low vapor pressure will remain in the resin many times longer before the minimum permissible volatile content is reached and volatile flow is lost. When this tape is used as a bonding agent it is clamped between the surfaces to be bonded and heated, and the important flow of the resinoid is induced by the presence of the low vapor pressure solvent, under the action of such heat and pressure, until the low pressure solvent is evaporated by the heat necessary for the complete polymerization of the resinoid. I have also found that the retention of the above percentage of low vapor pressure solvent acts as an excellent plasticizer so that the resin coated tape remains soft and pliable over a period of many months if stored at normal room temperature while previous tapes employing only a high vapor pressure solvent have deteriorated to the point of uselessness as a bonding material in several months when stored under the same conditions.

I do not wish to be limited to the details of the embodiment described or to the details of the manner of making the same, since changes may occur to one skilled in the art, without departing from the invention as defined by the claims appended hereto.

I claim:

1. The method of bonding a brake friction material segment to a brake shoe by a bonding tape, which consists in subjecting a sheet of indiscriminately disposed asbestos fibers to a soaking and coating with an adhesive composition comprising 35 to 45% thermosetting resinoid of the phenol aldehyde type in a mixed solution of 45 to 60% anhydrous denatured ethyl alcohol and 3 to 10% isophorone, drying said sheet under heat to evaporate the anhydrous denatured ethyl alcohol to the extent that substantially only the isophorone and resinoid remain in the resulting tape, and subjecting said tape to heat and pressure bonding between the brake friction material and the brake shoe, at which time the isophorone produces a flow of the resinoid and the resinoid is completely polymerized, and the isophorone is completely evaporated, said completely polymerized resinoid being free from all solvents, whereby the time element from the date of manufacture of the tape to its latest date of usefulness for said bonding has been increased by the presence of the isophorone.

2. The method of claim 1, in which the anhydrous denatured ethyl alcohol has a vapor pressure of about 44 mm. Hg at 20° C., and isophorone, a vapor pressure of .3 mm. Hg at 20° C., and the drying is at a temperature below 215.2° C.

SYDNEY G. TILDEN, JR.

References Cited in the file of this patent

UNITED STATES PATENTS

| Number | Name | Date |
|---|---|---|
| 1,550,310 | Fischer | Aug. 18, 1925 |
| 1,609,506 | Brock | Dec. 7, 1926 |
| 1,776,885 | Cheetham | Sept. 30, 1930 |
| 1,784,008 | Herrmann | Dec. 9, 1930 |
| 1,924,748 | Novotny | Aug. 29, 1933 |
| 1,960,176 | Weber | May 22, 1934 |
| 1,969,636 | Alden | Aug. 7, 1934 |
| 2,406,653 | Batchelor | Aug. 27, 1946 |
| 2,413,931 | Stamatoff | Jan. 7, 1947 |
| 2,426,421 | Tilden | Aug. 26, 1947 |

OTHER REFERENCES

Carbide & Carbon "Synthetic Org. Chemicals," 12th Ed., July 1, 1946, pages 56 and 57.